(12) United States Patent
Seifert

(10) Patent No.: US 7,248,692 B2
(45) Date of Patent: Jul. 24, 2007

(54) METHOD OF AND APPARATUS FOR DETERMINING A KEY PAIR AND FOR GENERATING RSA KEYS

(75) Inventor: Jean-Pierre Seifert, München (DE)

(73) Assignee: Infineon Technologies AG, Munich (DE)

( * ) Notice: Subject to any disclaimer, the term of this patent is extended or adjusted under 35 U.S.C. 154(b) by 657 days.

(21) Appl. No.: 10/449,371

(22) Filed: May 30, 2003

(65) Prior Publication Data

US 2004/0125949 A1    Jul. 1, 2004

Related U.S. Application Data

(63) Continuation of application No. PCT/EP01/14350, filed on Dec. 6, 2001.

(30) Foreign Application Priority Data

Dec. 12, 2000    (DE) ................ 100 61 697

(51) Int. Cl.
  *H04L 9/00* (2006.01)
(52) U.S. Cl. .................. 380/44; 380/28; 380/30; 380/278; 380/282; 380/47; 380/286
(58) Field of Classification Search .......... 380/28, 380/30, 44, 47, 278, 282, 286
  See application file for complete search history.

(56) References Cited

U.S. PATENT DOCUMENTS

| | | | |
|---|---|---|---|
| 5,046,094 A | | 9/1991 | Kawamura et al. |
| 5,761,310 A | * | 6/1998 | Naciri .................. 380/30 |
| 5,905,799 A | | 5/1999 | Ganesan |
| 5,999,627 A | * | 12/1999 | Lee et al. .............. 380/30 |
| 6,396,926 B1 | * | 5/2002 | Takagi et al. ........... 380/28 |

(Continued)

FOREIGN PATENT DOCUMENTS

| | | |
|---|---|---|
| EP | 0 872 795 A1 | 10/1998 |
| JP | 08251155 A | 9/1996 |

OTHER PUBLICATIONS

Schneier, Bruce: Applied Cryptography, Second Edetion, 1996, pp. 245-251.*

(Continued)

*Primary Examiner*—Kim Vu
*Assistant Examiner*—Beemnet W Dada
(74) *Attorney, Agent, or Firm*—Laurence A. Greenberg; Werner H. Stemer; Ralph E. Locher

(57) ABSTRACT

In a method of determining a pair of numbers comprising a first number and a second number, in which the first number may be a first key and the second number may be a second key of an encryption system and the second number is the multiplicative inverse with respect to a modulus of the first number, said modulus being equal to the product of a first prime number and a second prime number, the first number is selected first. Thereafter, a first sub-number for the second number is computed as a multiplicative inverse of the first number with respect to a first sub-modulus that is equal to the first prime number minus 1 divided by the greatest common divisor of the first prime number minus 1 and the second prime number minus 1. Then, a second sub-number for the second number is computed as multiplicative inverse of the first number with respect to a second sub-modulus that is equal to the second prime number minus 1, with said first sub-modulus and said second sub-modulus being relatively prime. Finally, the second number is determined using the first sub-number and the second sub-number by means of the Chinese remainder theorem. By utilization of the Chinese remainder theorem, the operation of forming the multiplicative inverse is transformed to two corresponding operations with shorter numbers and a fast combination step, so that an acceleration by the factor of 4 is obtained as compared to a method without Chinese remainder theorem.

7 Claims, 3 Drawing Sheets

U.S. PATENT DOCUMENTS

| | | | | |
|---|---|---|---|---|
| 6,473,508 | B1* | 10/2002 | Young et al. | 380/30 |
| 6,952,476 | B1* | 10/2005 | Mao | 380/30 |
| 7,054,444 | B1* | 5/2006 | Paillier | 380/30 |
| 7,123,717 | B1* | 10/2006 | Coron et al. | 380/28 |
| 2001/0036267 | A1 | 11/2001 | Paillier | |

OTHER PUBLICATIONS

Wu et al. RSA Cryptosystem Design Based on the Chinese Remainder Theorem, IEEE, 2001.*

Grobschadl, Johann, The Chinese Remainder Theorem and its Application in a High-Speed RSA Crypto Chip, Graz University of Technology.*

Desmedt, Y. et al.: "Multi-Receiver / Multi-Sender Network Security: Efficient Authenticated Multicast / Feedback", INFOCOM, IEEE, 1992, pp. 2045-2054.

Menezes, A. J. et al.: Handbook of Applied Cryptography, 8.2 RSA Public-Key Encryption, CRC Press, pp. 285-287.

Menezes, A. J. et al.: Handbook of Applied Cryptography, Chapter 2 Mathematical Background, CRC Press, pp. 68 and 613.

Koc, C. K.: "Montgomery Reduction with Even Modules", IEEE Proc.-Comput. Digit. Tech., vol. 141, No. 5, Sep. 1994, pp. 314-316.

Grossschädl, J.: "The Chinese Remainder Theorem and its Application in a High-Speed RSA Crypto Chip", IEEE, 2000, pp. 384-393.

* cited by examiner

METHOD OF AND APPARATUS FOR DETERMINING A KEY PAIR AND FOR GENERATING RSA KEYS

CROSS-REFERENCE TO RELATED APPLICATION

This application is a continuation of copending International Application No. PCT/EP01/14350, filed Dec. 6, 2001, which designated the United States and was not published in English.

BACKGROUND OF THE INVENTION

1. Field of the Invention

The present invention relates to the RSA cryptography algorithm and in particular to the generation of RSA keys. The RSA cryptosystem, named after its inventors R. Rivest, A. Shamir and L. Adleman, is one of the most widespread public key cryptosystems. It can be used both for obtaining secrecy and for generating digital signatures. Its security is based on the fact that the so-called integer factorization problem cannot be solved presently in algorithmically efficient manner.

2. Description of the Related Art

Before dealing with the RSA cryptosystem in more detail, some basic terms of cryptography shall be outlined first. Generally, a distinction is made between symmetric encryption systems, also referred to as secret key encryption systems, and public key encryption systems.

A communication system with two parties making use of encryption by means of symmetric keys, can be described as follows. The first party communicates its encryption key to the second party via a secure channel. The first party then encrypts the secret message by means of the key and transmits the encrypted message to the second party via a public or non-secured channel. The second party then decrypts the encrypted message by use of the symmetric key that was communicated to the second party via the secure channel. An essential problem with such encryption systems resides in providing an efficient way of exchanging the secret keys, i.e. of finding a secure channel.

In contrast thereto, asymmetric encryption is carried out as follows. A party desiring to receive a secret message communicates its public key to the other party, i.e. the party from which it desires to receive a secret message. The public key is communicated via a non-secured channel, i.e. via a "public" channel.

The party desiring to send a secret message receives the public key of the other party, encrypts the message using the public key and transmits the encrypted message again via a non-secured channel, and thus a public channel, to the party from which the public key was sent. Only the party that generated the public key is capable of making available a private key for decrypting the encrypted message. Not even the party that encrypted its message using the public key is in the position of decrypting the message. An advantage of this concept consists in that no secure channel, and thus no secret exchange of keys, is required between the two parties. The party that decrypted the message need not and must not know the private key of the message recipient.

A physically analogous scheme to the asymmetric encryption concept or the public key encryption concept can be outlined as follows. Consider a metal box with a lid secured by a combination lock. The combination is known only to the party desiring to receive an encrypted message. If the lock is left open and made available to the public, anybody desiring to communicate a secret message may place this message in the metal box and close the lid. However, only the party providing the box knows the combination of the combination lock. Only this latter party is in the position to decrypt the message, i.e. to reopen the metal box. Even the party that placed the message in the box can no longer retrieve the same.

Essential for asymmetric or public key encryption concepts is the underlying mathematical problem the solution of which is nearly impossible utilizing the public key for decryption, but the solution of which is easily possible knowing the private key. One of the most common public key cryptosystems is the RSA cryptosystem. The RSA cryptosystem is described in the "Handbook of Applied Cryptography", Menezes, van Oorschot, Vanstone, CRC Press 1997, pages 285 to 291.

The first task consists in generating the keys for the RSA cryptosystem. To this end, reference is made to FIG. 3. An entity that is to receive an encrypted message, in a first step 300 must generate first two large prime numbers p and q that preferably should have about equal quantities. Thereafter, in a step 310, the product of the two prime numbers is calculated, which is also referred to as modulus N. In addition thereto, Euler's $\phi$ function is computed, which is equal to the product of (p−1) and (q−1). In a step 320, a random integer e is selected then, with e being selected such that e is greater than 1 and smaller than $\phi$, with the further condition that the greatest common divisor gcd of e and $\phi$ is 1, i.e. that e and $\phi$ are relatively prime. Thereafter, in a step 330 a number d is computed that has to fulfil the following equation:

$$e \times d = 1 \bmod \phi$$

d is also referred to as multiplicative inverse with respect to modulus $\phi$ and usually is computed using the extended Euclidean algorithm, which is also described in the "Handbook of Applied Cryptography", page 67. d thus is a unique integer that is greater than 1 and smaller than $\phi$ and thus fulfils the equation given.

In a step 340, the public key is then output, with the public key comprising the modulus N and the number e. In contrast thereto, the private key d is not output, but is stored in a step 350 in order to be utilized for decryption when the key-generating entity has received a message that is encrypted using the public key output in step 340.

In the following, reference is made to FIG. 2 in order to illustrate the RSA algorithm. The initial situation is that one communication partner encrypts a message M that has to be decrypted by the other communication partner. The encrypting entity must first receive, in a step 200, the public key (N, e) in order to be able at all to send an encrypted message to the other party. Following this, the encrypting party, in a step 210, has to represent the message to be encrypted in the form of an integer M, with M having to be in the interval from 0 to N−1. In a step 220, which is the encryption step proper, the encrypting entity has to compute the following equation:

$$C = M^e \bmod N.$$

C is the encrypted message. This message is then output in a step 230 and transmitted to the recipient of the encrypted message via a public channel, designated 240 in FIG. 2. The recipient receives the encrypted message C in a step 250 and performs the following computation in a step 260, which is the decryption step proper:

$$M = C^d \bmod N.$$

It can be seen from FIG. 2 that only the public key (N, e) is necessary for encryption, but not the private key d, whereas decryption requires the private key d.

The question is now how an attacker can break the RSA cryptosystem. He knows the public key, i.e. N and e. In the same manner as shown in FIG. 3, he could now factorize the modulus N into a product of two prime numbers and then compute the secret key d in the same manner as it was done by the key-generating authentic party. To this end, the attacker would have to try all possible prime number pairs p', q' in order to sooner or later hit the private key d in consideration of e. With small prime numbers p and q, this problem is relatively easy to solve simply by trial. However, if p and q, i.e. the modulus N that is the product of p and q, become increasingly greater, the various possibilities for the factorization of modulus N increase to astronomical extents. This is what the security of the RSA system is based on. It can be seen therefrom that secure cryptosystems must make use of very long numbers that may have a length of, for example, 512, 1024 or even up to 2048 bits.

With increasing length of the prime numbers p and q, however, the computation of the multiplicative inverse, i.e. of the private key d in step 330 of FIG. 3, becomes time-critical as well. To this end, the extended Euclidean algorithm is utilized the required computation time of which may also assume considerable orders of magnitude with increasing length of the relevant numbers.

SUMMARY OF THE INVENTION

It is the object of the present invention to provide a more efficient concept for determining private keys.

In accordance with a first aspect of the invention, this object is achieved by a method of determining a pair of numbers comprising a first number and a second number, the second number being the multiplicative inverse with respect to a modulus of the first number, said modulus being equal to the product of a first prime number and a second prime number, said method comprising the steps of: selecting the first number; computing a first sub-number for the second number as a multiplicative inverse of the first number with respect to a first sub-modulus that is equal to the first prime number minus 1 divided by the greatest common divisor of the first prime number minus 1 and the second prime number minus 1; computing a second sub-number for the second number as multiplicative inverse of the first number with respect to a second sub-modulus that is equal to the second prime number minus 1, with said first sub-modulus and said second sub-modulus being relatively prime; and determining the second number using the first sub-number and the second sub-number by means of the Chinese remainder theorem.

In accordance with a second aspect of the invention, this object is achieved by a method of generating keys for an RSA encryption system, comprising the steps of: selecting two prime numbers; computing the product of the prime numbers; determining a pair of numbers comprising a first number and a second number, the second number being the multiplicative inverse with respect to a modulus of the first number, said modulus being equal to the product of a first prime number and a second prime number, step of determining method comprising the steps of: selecting the first number; computing a first sub-number for the second number as a multiplicative inverse of the first number with respect to a first sub-modulus that is equal to the first prime number minus 1 divided by the greatest common divisor of the first prime number minus 1 and the second prime number minus 1; computing a second sub-number for the second number as multiplicative inverse of the first number with respect to a second sub-modulus that is equal to the second prime number minus 1, with said first sub-modulus and said second sub-modulus being relatively prime; and determining the second number using the first sub-number and the second sub-number by means of the Chinese remainder theorem; outputting the product of the prime numbers and the first number of said pair of numbers as public key; and storing the second number as private key.

In accordance with a third aspect of the invention, this object is achieved by an apparatus for determining a pair of numbers comprising a first number and a second number, the second number being the multiplicative inverse with respect to a modulus of the first number, said modulus being equal to the product of a first prime number and a second prime number, said apparatus comprising: a means for selecting the first number; a means for computing a first sub-number for the second number as a multiplicative inverse of the first number with respect to a first sub-modulus that is equal to the first prime number minus 1 divided by the greatest common divisor of the first prime number minus 1 and the second prime number minus 1; a means for computing a second sub-number for the second number as multiplicative inverse of the first number with respect to a second sub-modulus that is equal to the second prime number minus 1, with said first sub-modulus and said second sub-modulus being relatively prime; and a means for determining the second number using the first sub-number and the second sub-number by means of the Chinese remainder theorem.

In accordance with a fourth aspect of the invention, this object is achieved by an apparatus for generating keys for an RSA encryption system, comprising: a means for selecting two prime numbers; a means for computing the product of the prime numbers; a means for determining a pair of numbers comprising a first number and a second number, the second number being the multiplicative inverse with respect to a modulus of the first number, said modulus being equal to the product of a first prime number and a second prime number, said means for determining comprising: a means for selecting the first number; a means for computing a first sub-number for the second number as a multiplicative inverse of the first number with respect to a first sub-modulus that is equal to the first prime number minus 1 divided by the greatest common divisor of the first prime number minus 1 and the second prime number minus 1; a means for computing a second sub-number for the second number as multiplicative inverse of the first number with respect to a second sub-modulus that is equal to the second prime number minus 1, with said first sub-modulus and said second sub-modulus being relatively prime; and a means for determining the second number using the first sub-number and the second sub-number by means of the Chinese remainder theorem, a means for outputting said product and the first number of said pair of numbers as public key; and a means for storing the second number as private key.

The present invention is based on the finding that, in computing the multiplicative inverse using Euler's $\phi$ function, there is the problem that the two factors of Euler's $\phi$ function, i.e. (p−1) and (q−1), are not relatively prime. This can be seen from that fact that prime numbers are odd numbers. If a value of "1" is subtracted from a prime number, an even number results, such that the two factors (p−1) and (q−1) are no longer relatively prime to this effect, as they now have at least the common divisor "2". Euclid's algorithm thus must be computed as set forth in FIG. 3 with respect to the prior art, using the number (p−1) (q−1) of the full bit length, so that this step becomes critical in terms of time.

According to the invention, the multiplicative inverse is no longer computed using Euler's $\phi$ function, but rather using Carmichael's $\lambda$ function.

Utilization of Carmichael's $\lambda$ function has the effect that two factors on the right-hand side of the equation for computing the multiplicative inverse are relatively prime, so that the Chinese remainder theorem, also referred to as CRT (CRT=Chinese Remainder Theorem), may be used. The Chinese remainder theorem and the algorithm of Garner are described e.g. on page 68 and pages 612, 613 in the "Handbook of Applied Cryptography". However, the Chinese remainder theorem can be utilized only if relatively prime factors are present.

In computing the private key d, i.e. the multiplicative inverse, the Chinese remainder theorem permits that, instead of one computation with full bit length, two computations of half bit length as well as a fast combination of the results of the two computations with half bit length need to be carried out.

This procedure has the effect that the private key can be computed up to four times faster than in case of utilization of Euler's $\phi$ function as in the prior art.

An advantage of the present invention consists in that, with the same computation time, it is now possible to make use of considerably longer prime numbers and that the security of the RSA cryptosystem can thus be increased considerably.

In contrast thereto, maintaining the same security standards as in the prior art, an acceleration with respect to computation time efficiency by a factor of four can be obtained right at the critical point, namely the computation of the multiplicative inverse. Crypto processors implemented according to the present invention thus may contribute to a considerable increase in efficiency of e.g. TPM modules (TPM=Trusted Platform Module) or security ICs. As an alternative, the method according to the invention may also be utilized in smart cards in which, due to the limited computation capacity available on the smart card, compromises are often made with respect to the prime number length and thus with respect to security. With the aid of the present invention, the security standards can be increased considerably, maintaining the same computation time.

Due to the fact that the two CRT terms can be computed separately from each other, the two CRT terms may also be computed in parallel in two separate arithmetic units and may finally be "joined together", so that further savings in computation time may be achieved by parallel implementation.

BRIEF DESCRIPTION OF THE DRAWINGS

A preferred embodiment of the present invention will be elucidated hereinafter with reference to the accompanying drawings in which.

DESCRIPTION OF THE PREFERRED EMBODIMENTS

Figure 1:
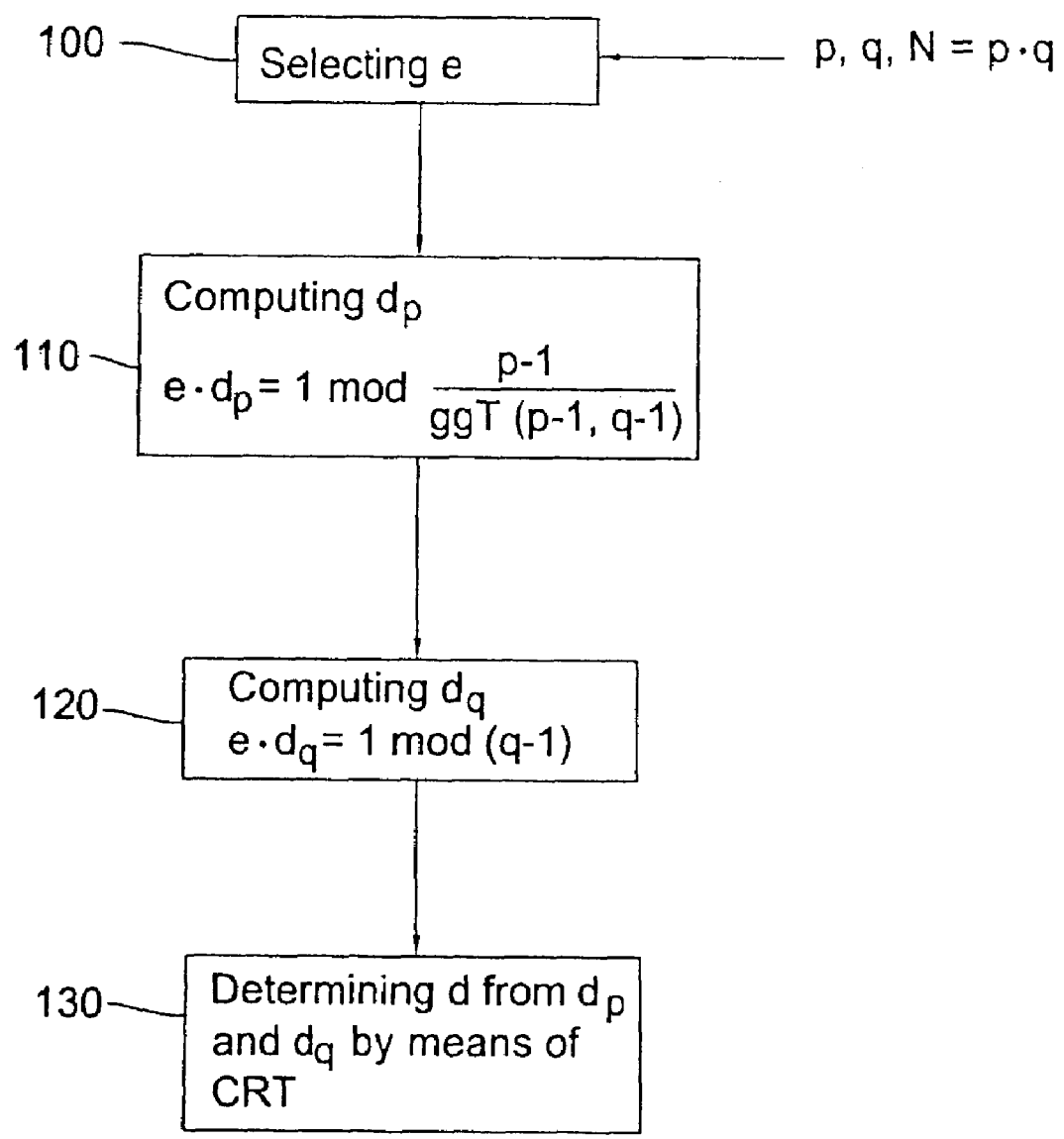
FIG. 1 shows a block diagram of a preferred embodiment of the method according to the invention.
Figure 2:
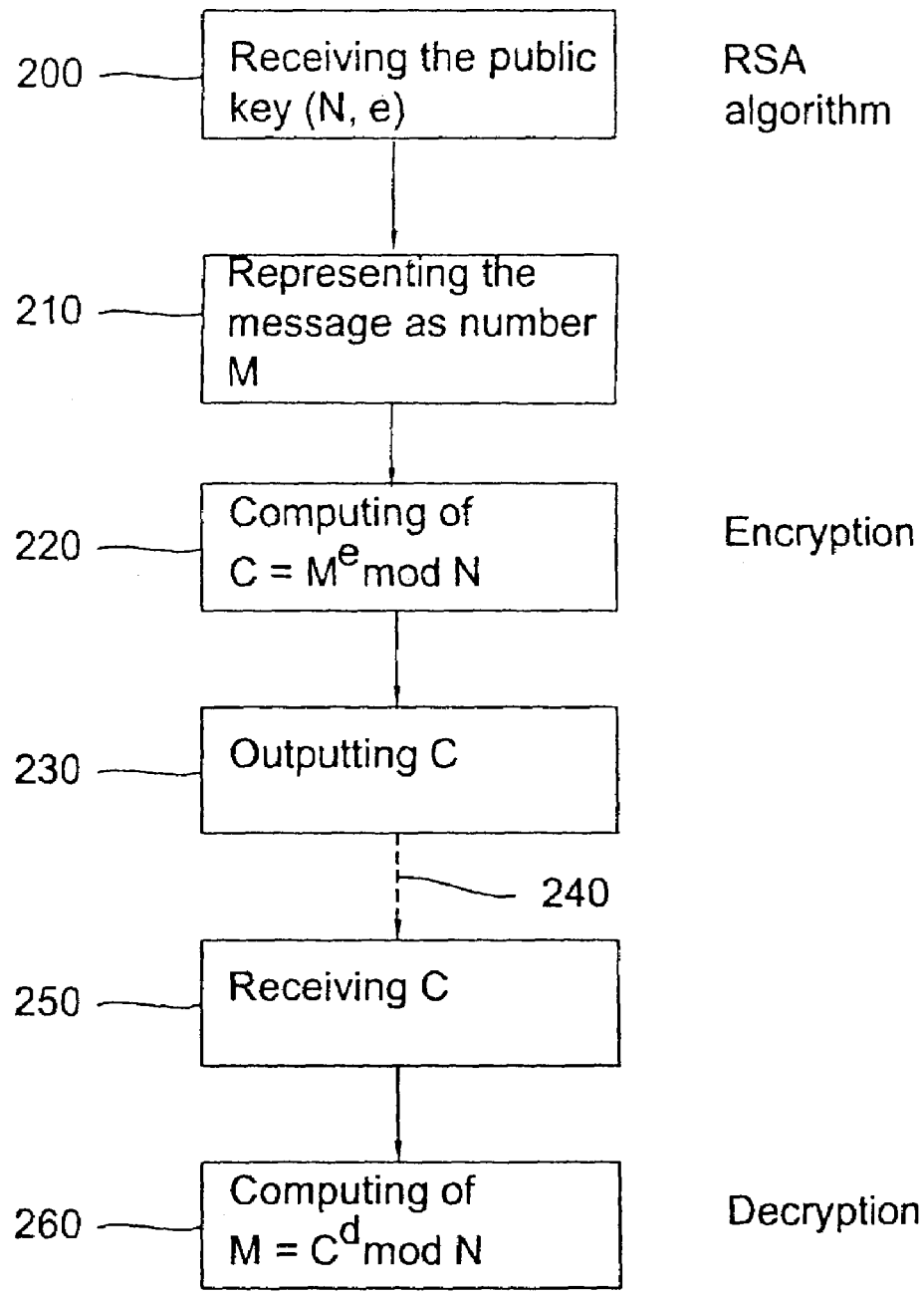
FIG. 2 shows a summary of the RSA algorithm.
Figure 3:
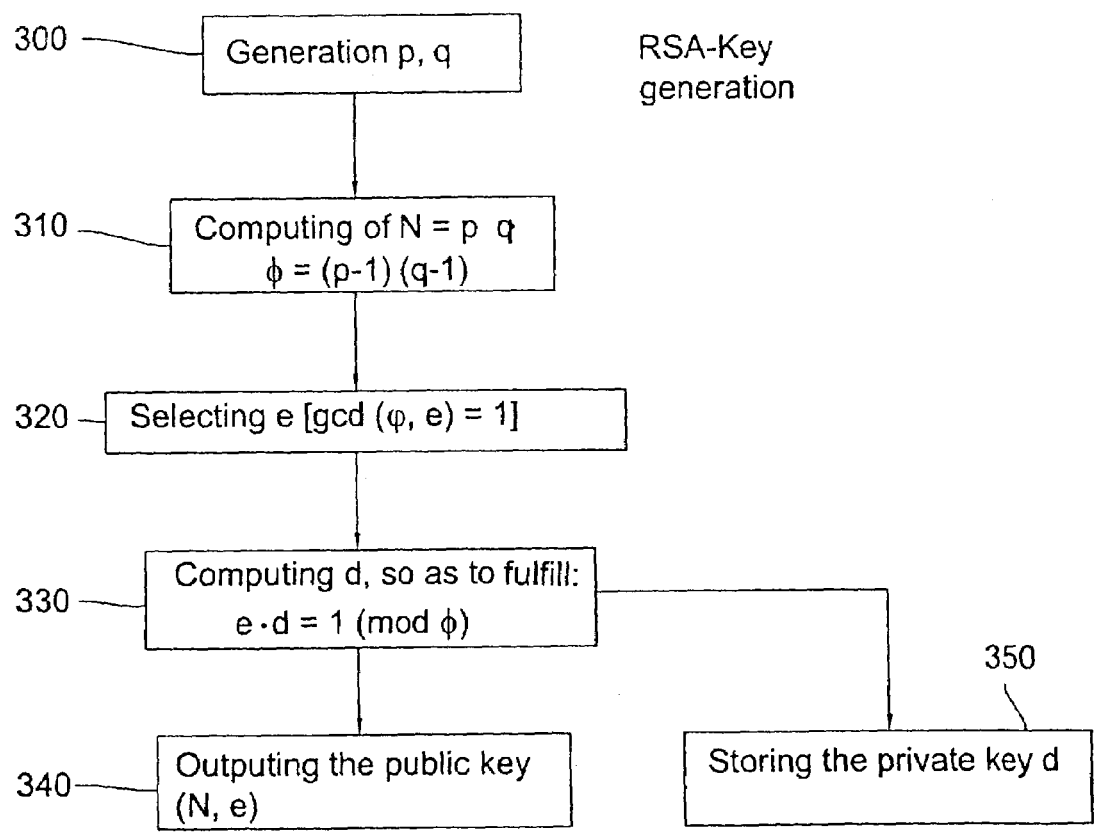
FIG. 3 shows a schematic flow chart for RSA key generation.

FIG. 1 shows a preferred embodiment of the method of determining a key pair e, d, according to the invention, in which two prime numbers p, q are generated first, as is usual, which, multiplied by each other, result in the modulus N. In step 100, a first key e is selected then. Contrary to the prior art, however, the second key d is no longer computed using Euler's $\phi$ function, but rather Carmichael's $\lambda$ function. Carmichael's $\lambda$ function is given as follows:

$$\lambda(N)=(p-1)(q-1)/gcd(p-1,q-1).$$

The following relationship holds for Carmichael's $\lambda$ function:

$$M^{\lambda(N)}=1 \bmod N.$$

The second key, i.e. the secret key d, then is computed on the basis of the known data e, p and q as follows:

$$e \times d = 1 \bmod \lambda(N).$$

For solving the above equation, i.e. for computing the multiplicative inverse d, the Chinese remainder theorem (CRT) may be used now since the factors $$(p-1)/gcd(p-1,q-1) \text{ and}$$

$$(q-1)$$

now are relatively prime.

By means of the Chinese remainder theorem, the problem of computing the multiplicative inverse d may now be split into the computation of two multiplicative inverses $d_p$ and $d_q$ and a combination step.

To this end, $d_p$ first is computed so as to fulfil the following defining equation:

$$e \times d_p = 1 \bmod [(p-1)/gcd(p-1,q-1)].$$

Analogously thereto, $d_q$ can be computed using the following defining equation:

$$e \times d_q = 1 \bmod (q-1).$$

Alternatively, the relatively prime factors could also be obtained in the opposite manner, namely as $$(p-1) \text{ and}$$

$$(q-1)/gcd(p-1,q-1).$$

It is to be pointed out that, as known from the CRT, the two sub-keys $d_p$ and $d_q$ are half as long as the second key d proper.

It is to be pointed out that the steps 110 and 120 of FIG. 1 make use of two different sub-moduli. The first sub-modulus in step 110 reads:

$$(p-1)/gcd(p-1,q-1).$$

The second sub-modulus in step 120 merely reads:

$$(q-1).$$

It can be seen that the two sub-moduli are relatively prime due to the gcd function, so that the CRT will be successful. The two sub-keys $d_p$ and $d_q$ then are combined in a step 130 using the Chinese remainder theorem (CRT) in order to thus generate the second or private key d.

To this end, an auxiliary quantity $x_p$ is computed first, which is defined by the following equation:

$$x_p = (d_p - d_q) \times [(q-1)^{-1} \bmod (p-1)/gcd(p-1,q-1)] \bmod (p-1)/gcd(p-1,q-1).$$

The inverse computation and the gcd computation in the above quotation are carried out using numbers of half length, which has the effect that these steps are less time-critical.

The second key or private key d then results as follows:

$$d = [d_p]d_p + x_p \times (q-1) \bmod \lambda(N).$$

It is to be pointed out that the modular reduction with mod $\lambda(N)$ in the above equation need not be carried out any more, as d already is in the remainder class without reduction.

When the present invention is utilized for RSA key generation, the latter improves in terms of its complexity in time, since the computation of multiplicative inverses, by way of the extended Euclidean algorithm, needs to be carried out with half bit length only as regards modulus N. The computation of the secret key d by means of the Chinese remainder theorem is faster by the factor of 4 as compared to the situation using no Chinese remainder theorem since, instead of using Euler's φ function for computing the key pair e and d, Carmichael's λ function is utilized as the same can be represented as a product of two relatively prime factors which then constitute the two sub-moduli for the Chinese remainder theorem.

It is to be pointed out that the concept according to the invention cannot only be utilized for RSA key generation, but in all situations in which a multiplicative inverse to a number is to be computed, with the modulus consisting of two or more factors that are not relatively prime with respect to each other. Carmichael's λ function at all times will have the effect that the multiplicative inverse with respect to a modulus can be obtained using the Chinese remainder theorem as there are now relatively prime factors present that can be employed as sub-moduli.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method of determining a pair of numbers comprising a first number and a second number, the second number being the multiplicative inverse with respect to a modulus of the first number, said modulus being equal to the product of a first prime number and a second prime number, said method comprising the steps of:
   selecting the first number;
   computing a first subnumber for the second number as a multiplicative inverse of the first number with respect to a first sub-modulus that is equal to the first prime number minus 1 divided by the greatest common divisor of the first prime number minus 1 and the second prime number minus 1;
   computing a second subnumber for the second number a multiplicative inverse of the first number with respect to a second sub-modulus that is equal to the second prime number minus 1, with said first sub-modulus and said second sub-modulus being relatively prime; determining the second number using the first sub-number and the second sub-number by means of the Chinese remainder theorem;
   storing the second number as a private key; and
   outputting at least one of the first and second numbers for use as a key in a cryptosystem.

2. A method according to claim 1, wherein the first number and the second number are a key pair, one key serving as public key and a second key serving as the private key of an asymmetric encryption system.

3. A method according to claim 1, wherein said step of computing the first sub-number and said step of computing the second sub-number make use of the extended Euclidean algorithm.

4. A method according to claim 1, wherein said step of determining makes use of the following equations:

$$x_p = (d - d_q) \times [(q-1)^{-1} \bmod (p-1)/gcd(p-1,q-1)] \bmod (p-1)/gcd(p-1,q-1)$$

$$d = d_q + x_p \times (q-1)$$

wherein
$d_p$ is the first sub-number;
$d_q$ is the second sub-number;
q is the first prime number;
p is the second prime number;
gcd designates the operation "greatest common divisor";
mod designates the modular operation; and
$x_p$ is an auxiliary quantity.

5. A method of generating keys for an RSA encryption system, comprising the steps of:
   selecting two prime numbers;
   computing the product of the prime numbers;
   determining a pair of numbers comprising a first number and a second number, the second number being the multiplicative inverse with respect to a modulus of the first number, said modulus being equal to the product of a first prime number and a second prime number, step of determining method comprising the steps of:
   selecting the first number;
   computing a first sub-number for the second number as a multiplicative inverse of the first number with respect to a first sub-modulus that is equal to the first prime number minus 1 divided by the greatest common divisor of the first prime number minus 1 and the second prime number minus 1;
   computing a second sub-number for the second number as multiplicative inverse of the first number with respect to a second submodulus that is equal to the second prime number minus 1, with said first sub-modulus and said second sub-modulus being relatively prime; and
   determining the second number using the first sub-number and the second sub-number by means of the Chinese remainder theorem;
   outputting the product of the prime numbers and the first number of said pair of numbers as public key; and
   storing the second number as private key.

6. An apparatus for determining a pair of numbers comprising a first number and a second number, the second number being the multiplicative inverse with respect to a modulus of the first number, said modulus being equal to the product of a first prime number and a second prime number, said apparatus comprising:
   a means for selecting the first number;
   a means for computing a first sub-number for the second number as a multiplicative inverse of the first number with respect to a first sub-modulus that is equal to the first prime number minus 1 divided by the greatest common divisor of the first prime number minus 1 and the second prime number minus 1;
   a means for computing a second sub-number for the second number as multiplicative inverse of the first number with respect to a second sub-modulus that is equal to the second prime number minus 1, with said first sub-modulus and said second sub-modulus being relatively prime;

a means for determining the second number using the first sub-number and the second sub-number by means of the Chinese remainder theorem;

a means for storing the second number as a private key; and means for outputting at least one of the first and second numbers for use as a key in a cryptosystem.

7. An apparatus for generating keys for an RSA encryption system, comprising:

a means for selecting two prime numbers;

a means for computing the product of the prime numbers;

a means for determining a pair of numbers comprising a first number and a second number, the second number being the multiplicative inverse with respect to a modulus of the first number, said modulus being equal to the product of a first prime number and a second prime number, said means for determining comprising:

a means for selecting the first number;

a means for computing a first sub-number for the second number as a multiplicative inverse of the first number with respect to a first sub-modulus that is equal to the first prime number minus 1 divided by the greatest common divisor of the first prime number minus 1 and the second Prime number minus 1;

a means for computing a second sub-number for the second number as multiplicative inverse of the first number with respect to a second sub-modulus that is equal to the second prime number minus 1, with said first sub-modulus and said second sub-modulus being relatively prime; and a means for determining the second number using the first sub-number arid the second sub-number by means of the Chinese remainder theorem;

a means for outputting said product and the first number of said pair of numbers as public key; and a means for storing the second number as private key.

* * * * *